(12) United States Patent
Lomas

(10) Patent No.: US 10,443,000 B2
(45) Date of Patent: Oct. 15, 2019

(54) HIGHER CONTAINMENT VSS WITH MULTI ZONE STRIPPING

(71) Applicant: Marathon Petroleum Company LP, Findlay, OH (US)

(72) Inventor: David Lomas, Barrington, IL (US)

(73) Assignee: Marathon Petroleum Company LP, Findlay, OH (US)

( * ) Notice: Subject to any disclaimer, the term of this patent is extended or adjusted under 35 U.S.C. 154(b) by 256 days.

(21) Appl. No.: 15/613,938

(22) Filed: Jun. 5, 2017

(65) Prior Publication Data

US 2018/0208857 A1 Jul. 26, 2018

Related U.S. Application Data

(60) Provisional application No. 62/345,712, filed on Jun. 3, 2016.

(51) Int. Cl.
| | | |
|---|---|---|
| *C10G 11/05* | (2006.01) | |
| *C10B 3/00* | (2006.01) | |
| *C10G 11/18* | (2006.01) | |
| *B01J 8/18* | (2006.01) | |
| *B01D 45/16* | (2006.01) | |

(52) U.S. Cl.
CPC .............. *C10G 11/05* (2013.01); *B01J 8/1872* (2013.01); *C10B 3/00* (2013.01); *C10G 11/18* (2013.01); *B01D 45/16* (2013.01)

(58) Field of Classification Search
CPC ........ C10G 11/05; C10G 11/18; B01J 8/1872; B01D 45/16; C10B 3/00
See application file for complete search history.

(56) References Cited

U.S. PATENT DOCUMENTS

| | | | |
|---|---|---|---|
| 4,482,451 A | 11/1984 | Kemp | |
| 5,584,985 A | 12/1996 | Lomas | |
| 6,296,812 B1 * | 10/2001 | Gauthier | B01D 45/12 422/144 |
| 6,814,941 B1 | 11/2004 | Naunheimer | |
| 7,332,132 B2 | 2/2008 | Hendrick | |
| 2006/0049082 A1 | 3/2006 | Niccum et al. | |

* cited by examiner

*Primary Examiner* — Randy Boyer
*Assistant Examiner* — Juan C Valencia
(74) *Attorney, Agent, or Firm* — Schaffer, Schaub & Marriott LTD

(57) ABSTRACT

This patent application discloses engineering design modifications to the VSS exit, stripper entrance and the primary cyclone diplegs that can significantly reduce the underflow of reactor riser products into the stripper and reactor vessel and thereby produce higher desired product selectivities, improved stripping efficiency and a stripper vent gas, that continuously flows through the reactor vessel, with a low coke forming potential due to its low concentration of ethylene and higher molecular weight material, that could, if desired, be recovered separately from the primary riser products.

32 Claims, 12 Drawing Sheets

HIGHER CONTAINMENT VSS WITH MULTI ZONE STRIPPING

CROSS REFERENCE TO RELATED APPLICATION

The present patent application is based upon and claims the benefit of provisional patent application No. 62/345,712, filed on Jun. 3, 2016.

FIELD OF THE INVENTION

The present invention discloses engineering design modifications to the vortex separation system (VSS) exit, stripper entrance and the primary cyclone diplegs that can significantly reduce the underflow of reactor riser products into the stripper and reactor vessel and thereby produce higher desired product selectivities, improved stripping efficiency and a stripper vent gas, that continuously flows through the reactor vessel, with a low coke forming potential due to its low concentration of ethylene and higher molecular weight material, that could, if desired, be recovered separately from the primary riser products.

BACKGROUND OF THE INVENTION

Over the years, the FCC reactor section has been developed from Bed and Riser Systems to various current High Containment Configurations. These High Containment Reactor Systems should include:
- Rough-Cut Cyclones
- Direct Coupled Cyclones
- VSS/VDS With these Reactor Systems, the vast majority of the catalytic reactions and conversion now take place in a highly selective dilute phase transport regime with short contact times and essentially plug flow conditions.

However, by using a combination of various published commercial data, along with fundamental catalytic cracking mechanisms and fluidization, one can show that further significant selectivity improvements can still be achieved by making some key design modifications that will produce even higher product containment, with improved operability and better overall stripping efficiencies.

Here it must be understood that various equations are presented in support of the findings disclosed in the application and a table defining the nomenclature used in such would be helpful in the understanding and is presented below.

J TURNOVER RATE OF SOLIDS $lb/Ft^2/sec$
Kea EFFECTIVE AXIAL THERMAL CONDUCTIVITY OF THE BED
Btu/Ft/F/Hr
$\alpha$ RATIO OF WAKE TO BUBBLE VOLUME
$\rho_s$ SKELETAL DENSITY OF SOLIDS $lb/Ft^3$
$\rho_{mf}$ MINIMUM FLUIDIZATION DENSITY $lb/Ft^3$
$\varepsilon_{mf}$ VOID FRACTION AT MINIMUM FLUIDIZATION
$\varepsilon$ VOID FRACTION
U SUPERFICIAL GAS VELOCITY Ft/Sec
$U_L$ & $U_e$ SUPERFICIAL EMULSION PHASE VELOCITY Ft/Sec
$U_B$ BUBBLE RISE VELOCITY OF A CROWD OF BUBBLES Ft/Sec
$U_{mf}$ MINIMUM FLUIDIZATION VELOCITY Ft/Sec
$U_{mb}$ MINIMUM BUBBLING VELOCITY Ft/sec
$\cap$" BUBBLE FREQUENCY RELATIVE TO PACKET OR EMULSION
$\cap$' BUBBLE FREQUENCY RELATIVE TO A STATIONARY OBSERVER
$V_B$ BUBBLE VOLUME Ft3
A CROSS SECTIONAL AREA Ft2
W CATALYST FLUX lb/Ft2/Sec With the nomenclature now defined, turning to Table 1, it is found to show published commercial vapor samples taken from a modern Direct Coupled Cyclone System. Sample (1) represents the final FCC products and sample (2), taken from the reactor vessel, represents the combined hydrocarbon composition of the stripper effluent and the voidage or underflow material flowing with the catalyst down the cyclone diplegs. Unlike the bulk of the contained riser products, the underflow and stripper material suffers additional catalytic cracking in a now less than desirable pseudo Dense Bed reactor configuration with a high degree of backmixing, low space velocity and high residence times. The change in not only selectivity, but product composition between the two samples is enormous and very significant.

TABLE 1

| | FCC Products | |
| --- | --- | --- |
| YIELDS | SAMPLE 1 | SAMPLE 2 |
| DRY GAS | 2.7 | 15.6 |
| C3 LV % | 8.9 | 17.2 |
| C4 LV % | 14.9 | 20.4 |
| GASOLINE LV % | 54.2 | 46.6 |
| LCO LV % | 20.9 | 10.0 |
| CO LV % | 8.1 | 5.8 |

With the pseudo Dense Bed reactor, the catalytically cracked products in sample (2) will be rich in $C_3$, $C_4$, $C_5$, and Iso-$C_6$ branched paraffins rather than olefins. Significant gasoline yield has been lost to these products; but under these pseudo Dense Bed conditions, additional production of iso-paraffins from iso-olefins via hydrogen transfer and the generation of aromatics by cyclization and dehydrogenation will occur. The gasoline paraffin, isomer, naphthene, and aromatic composition will be totally transformed; now being much richer in toluene and xylenes, it will have a research octane number approaching 100.

The still unconverted cycle oils are now essentially all highly de-alkylated, two, three and four ring aromatics; with all the remaining alkyl groups being primarily methyl and a few ethyl.

However, all this undesirable secondary catalytic cracking of the riser products does not explain the high 15.6 Wt% dry gas production. The vast majority of this dry gas production is actually being generated from the chemically adsorbed material on the catalyst's surface, which is often referred to as "soft coke". This material is composed primarily of two or more highly condensed ring aromatics and plays a significant role in the complex sequence of the final "hard coke" formation. The coke forming tendency of these compounds correlates well with their basicity due to the catalytic surfaces acid-base interaction.

First, the quantity of this undesirable riser underflow material can be determined from calculations of the flowing catalyst voidage down the primary and secondary cyclone diplegs. With the void fraction being represented by:

$\varepsilon = (1 - \rho_B/\rho_s)$ where $\rho_s$ is the skeletal density

Under normal FCC reactor conditions and assuming an average riser product molecular weight of 100, Table 2 shows, the estimated voidage or underflow material could be anywhere from 3 Wt% to 8 Wt% on a fresh feed basis; and since all the catalyst flows with the underflow, this Wt% "soft coke" could easily be equivalent to the Wt% hydrocarbon underflow.

Note: In Table 2 the voidage calculations and their estimated Wt% of fresh feed do not include this soft coke term since it is chemically adsorbed material on the catalyst's surface.

TABLE 2

HYDROCARBON UNDERFLOW AND DIPLEG DENSITY

| DIPLEG DENSITY | HCBN's ACF/lbFF | HCBN's Wt % FF |
| --- | --- | --- |
| 50 | 0.0973 | 2.16 |
| 40 | 0.1323 | 2.93 |
| 30 | 0.1907 | 4.23 |
| 20 | 0.307 | 6.81 |

Secondly, we can now determine the light cracked gas that's being produced in these secondary pseudo Dense Bed reactors and strippers. Since this adsorbed "soft coke" material undergoes further dealkylation and condensation reactions with higher aromatic ring formations. In the process, they will produce relative equal amounts of hydrogen and methane on a molecular basis, due to the alkyl groups that are present. Similar type reactions will also produce significant quantities of hydrogen sulfide from this strongly adsorbed "soft coke". The highly, more condensed multi-ring aromatics become even more strongly adsorbed on the surface of the catalyst; and ultimately finish up as "hard coke" in the regenerator. With these reactions, the resulting dry gas composition is therefore quite different from that produced in the primary riser. If we assume a typical 50/50 Mol% Hydrogen/Methane blend in sample 2's dry gas fraction. Using a typical dipleg density and a 5 Wt% of fresh feed underflow, one can then calculate the weight and volume percent dry gas that's produced from the "soft coke" on a Wt% net underflow or fresh feed basis. See FIG. 11.

The estimated numbers in FIG. 11 are for the secondary dry gas production from the "soft coke" in the DCC's reactor vessel, diplegs and stripper sections. They are large, particularly on a volume basis, and become very significant.

Normal stripping steam rates are set around 2 pound's steam/1000 pound's of catalyst. In a unit with 7 cat/oil this steam usage is 1.4 Wt% of fresh feed (FF) or 7.77 Vol % of Rx Effluent. The total estimated dry gas production from the cracked "soft coke" along with that produced with the additional underflow conversion, equates to 0.81 Wt% of FF. As shown in Table 3, with a 9 to 18 molecular weight advantage, this cracked gas can become higher than the normal stripping steam rates on a volume basis.

TABLE 3

CRACKED "SOFT COKE"

|  | Mol WT | Wt % FF | Vol % Rx Eff |
| --- | --- | --- | --- |
| STRIPPING STEAM | 18 | 1.4 | 7.77 |
| CRACKED DRY GAS | 9 | 0.81 | 9 |
| HCBN UNDERFLOW | 100 | 5 | 5 |

The "soft coke" dry gas production on a typical 5.5 wt% coke yield would be 11.50 Wt% of the overall units enthalpy coke yield. An additional review of the "soft coke", "hard coke" hydrogen balance yields:

| SOFT COKE | HARD COKE | DRY GAS |
| --- | --- | --- |
| 111.50 (X)= | 100 (0.06) + | 11.50 (0.30) |
|  | X = 8.48 Wt % Hydrogen. | |

All these numbers make sense and are very significant. The "soft coke" underflow is calculated having a 8.48 Wt% hydrogen content but the final "hard coke" entering the regenerator as a much lower 6.0 Wt% hydrogen content.

The simple magnitude of this cracked gas on a volume basis (9 verses 7.77) will have a significant impact on all commercial stripping efficiencies particularly on a volume basis. Yet none of the previous, cold flow modeling work associated with FCC strippers appear to have taken into account the magnitude of this inert, extremely low molecular weight, material that's being continuously produced from the catalyst's surface.

In reviewing these various none-selective post riser reactions it does need to be emphasized that many will occur almost instantaneously in the low space velocity, pseudo beds; however, the condensation "soft coke" reactions will take significantly longer and will be highly dependent on reactor temperature.

Unlike the catalyst flow in the DCC's primary cyclone diplegs the fluidized state in the reactor stripper and lower VSS chamber is ideally that of a flowing counter current, dense phase, gently bubbling bed. A dense fluidized bed has many unique and beneficial characteristics; but the high degree of axial solids mixing along with low contacting efficiency between the bubbling gas phase and the solid emulsion phase, can be quite detrimental. The reactor stripping section therefore typically contains various internals in order to limit the overall backmixing and approach a more desirable "plug flow" stripper via the use of multiple "backmixed" stages. Table 4, shows the calculated volume percent hydrocarbon displacement that can be expected for various steam/hydrocarbon ratios along with the number of theoretical "backmixed" stages.

TABLE 4

REACTOR STRIPPER & THEORETICAL BACKMIXED STAGES

| STM/HCBN Ratio | 1.0 | 1.0 | 1.0 | 1.0 | 1.0 |
| --- | --- | --- | --- | --- | --- |
| STAGE | 1 | 2 | 3 | 4 | 6 |
| Vol % HCBN REMOVED | 50.0 | 67.0 | 75.0 | 80.0 | 85.7 |
| STM/HCBN Ratio |  | 2.0 | 2.0 | 2.0 | 2.0 |
| STAGE |  | 1 | 2 | 3 | 4 |
| Vol % HCBN REMOVED |  | 67.0 | 85.7 | 93.4 | 96.8 |
| STM/HCBN Ratio |  | 4.0 |  | 4.0 |  |
| STAGE |  | 1 |  | 2 |  |
| Vol % HCBN REMOVED |  | 80.0 |  | 95.2 |  |

Using the classic bubbling bed model and some calculated fluidization parameters, one can review and discuss the various design and operating conditions presently used in the lower VSS chamber, stripper and its internals and the cyclone diplegs. Kunni and Levenspiel proposed a bubbling bed model that views a vigorously bubbling fluidized bed to consist of a crowd of uniformly sized bubbles rising through the continuous phase, called the emulsion. Each bubble is surrounded by its cloud of circulating gas that is followed by a wake of material. Thus, solids are carried up the bed in the bubble wakes and move downwards elsewhere. In a stationary bed, there is no net flow of solids across the plain X-X.

The mixing between the steam rich bubble phase and the hydrocarbon rich emulsion phase is therefore limited and set by diffusion.

This axial turnover rate, or backmixing in a vigorously bubbling and flowing bed, can become extremely high and very detrimental to high containment of the reactor products and efficient counter current "plug flow" stripping. Van Deemeter, Lewis and May developed various expressions to relate this axial mixing, dispersion coefficient and effective thermal conductivity for such bubble induced circulation of solids.

Turnover rate of solids:

$$J = \alpha \rho_s (1 - \varepsilon_{mf})(U - U_{mf}) \text{ lb/Ft}^2/\text{sec}$$

For FCC type material J=20-30 lb/Ft²/sec at 1 ft/sec superficial gas velocity.

The high "J" values generated within the stationary bubbling bed are very significant. For a moving bubbling bed, these expressions should be based on the relative bubble frequency rather than the superficial gas velocity. Nicklin for a liquid/gas system showed this relative bubble frequency to be:

$$\cap''(V_B/A) = U(1 + (U_L/(U_B - U)))$$

$$\cap'' = \cap' = (A/V_B)U$$

Or that the bubble frequency relative to the emulsion phase is equivalent to the superficial velocity when $U_L$ is zero and the bed is stationary. Since the lower VSS chamber and reactor stripper operate at gas velocities $\gg U_{mf}$, for a Geldart type "A" solids, these liquid/gas relationships of Nicklin are very applicable to these FCC flowing systems.

Since $\varepsilon = U/(U+U_B-U_L)$, the void fraction $\varepsilon$ will approach 1.0 when the velocity of the emulsion phase approaches the bubble rise velocity, and this can lead to flow instability in lower strippers and standpipes.

In summary when:

$U_L < U_B$ counter current flow will exist
$U_L = U_B$ $\varepsilon$ goes to 1.0 and flow instability results
$U_L > U_B$ co-current flow will exist Therefore, for a stable dense phase, counter current flow $U_L$ should be $< U_B$. In the case of the FCC VSS and stripper where $U_L$ is the emulsion phase velocity, this is set by the design's "open area" catalyst flux lb/ft²/sec. Table 5, shows typical operating conditions used in various cold flow modeling studies of the FCC reactor stripper system.

TABLE 5

| TYPICAL FCC REACTOR STRIPPER OPERTING CONDITIONS | |
|---|---|
| EQUIVALENT AIR (lbSTM/1000 lb CAT) | 0.5-2.5 |
| STAGES | 7 |
| CATALYST FLUX lb/Ft2/SEC | 17-33 |
| CATALYST BED DENSITY lb/Ft3 | 40-50 |
| SUPERFICIAL GAS VEL Ft/Sec | 1-1.5 |

At superficial gas velocities much greater than 1 ft/sec, the bubble rise velocity can become limiting. Yerushalmi reported this transition between the bubbling and turbulent bed with respect to the relative pressure fluctuations at the beds surface. Much beyond this velocity, more and more of the gas phase starts to flow through high voidage gas channels rather than distinct bubbles. The bubble frequency eventually plateaus; as do the beds, solids turnover, axial diffusivity, effective conductivity and the bed to surface heat transfer coefficient.

The catalyst physical properties, such as particle size distribution, angle of repose, and the <40µ fines content, play a significant role in setting $D_b$ and the various characteristics of the fluidized bed. All the major FCC licensors have conducted extensive cold flow modeling, using helium tracer gas, in order to study the performance of various internal designs. As predicted, flow instability occurred along with reduced stripping efficiencies above certain catalyst fluxes. All report internal designs that can achieve overall stripping efficiencies >95 Vol % at the operating conditions shown in Table 5. However, none of these studies appear to have considered the significant impact of the secondary "cracked gas" reactions, "J" values and the beds freeboard activity would have on riser product underflows and stripping efficiency.

Since the stripping steam is usually based on pound's/ 1000 pound's of catalyst, the relationship between superficial gas velocity and catalyst flux can generate some interesting trends due to the prevailing "J"s. At the higher gas rates, the backmixing 'J' values can be equal to, or significantly higher than, the net flowrate of catalyst. As some of the modeling data suggests, with moderate to high gas rates as you slow the catalyst down, you are actually increasing the degree of backmixing (J/W) and the stripping efficiency can decline.

When compared to the theoretical stages in Table 4, the cold flow modeling results do not exhibit any great removal efficiencies. At a relatively low 1 lbsteam/1000 lbcatalyst, which is equivalent to a 3.6 steam/hydrocarbon volume ratio, a stripper with only two theoretical stages would achieve 94.3% removal. There is also no published data on actual commercial stripper efficiencies, where these slow secondary reactions and the hydrogen/methane production could drastically lower the volume percent hydrocarbon removal.

All these high containment systems now have small amounts of still reactive riser products that spend considerable time at temperature in the reactor vessel. Their concentrations have often been significant enough to form highly undesirable and often problematic coke depositions.

SUMMARY OF INVENTION

Based on this detailed review of current high containment designs, one can clearly see the potential for various significant and patentable design improvements particularly in the VSS and stripper system. This patent discloses various engineering design modifications to the VSS exit, stripper entrance and the primary cyclone diplegs. The design of a three zone stripper can significantly reduce the fluidized beds freeboard activity, superficial velocity, and J value. These novel design modifications can be applied to a new or existing high containment VSS system and thereby significantly reduce the underflow of reactor riser products into the stripper and reactor vessel, producing higher desired product selectivities and improved stripping efficiency. The stripper vent gas, which continuously flows through the reactor vessel, will now have a low coke forming potential due to its low concentration of ethylene and higher molecular weight material that could now, if desired, be recovered separately from the primary riser products that flow into the main column and gas concentration units.

Additionally, for a ZSM-5 type petrochemical operation, space velocity and J values can now be controlled independently within the VSS chamber via additional steam injection to independently control superficial gas velocities and catalyst transport rates to the primary cyclone. In this invention, the stripper vent gas can not only be recovered and treated separately but with its high hydrogen and methane content it can be used in a regenerator combustion chamber to augment the enthalpy balance, increase liquid volume yield and reduce regenerator "Green House" gases, $NO_x$ and $SO_x$ emissions.

Also, the catalyst residence times in the first and second stripping zones can be controlled via the reactor level and the spent slide valve opening. The residence time in the first zone is now particularly significant in that it will set the degree of dry gas production from the "soft coke" which will also vary with, and be dependent on, reactor temperature. This improved RTD in the three zone stripper leads to lower regenerator $SO_x$ levels via the increased conversion of "soft coke" sulfur to hydrogen sulfide followed by its higher removal efficiency from within the catalyst voidage going to the regenerator.

DETAILED DESCRIPTION OF THE PREFERRED EMBODIMENT(S)

Figure 1:
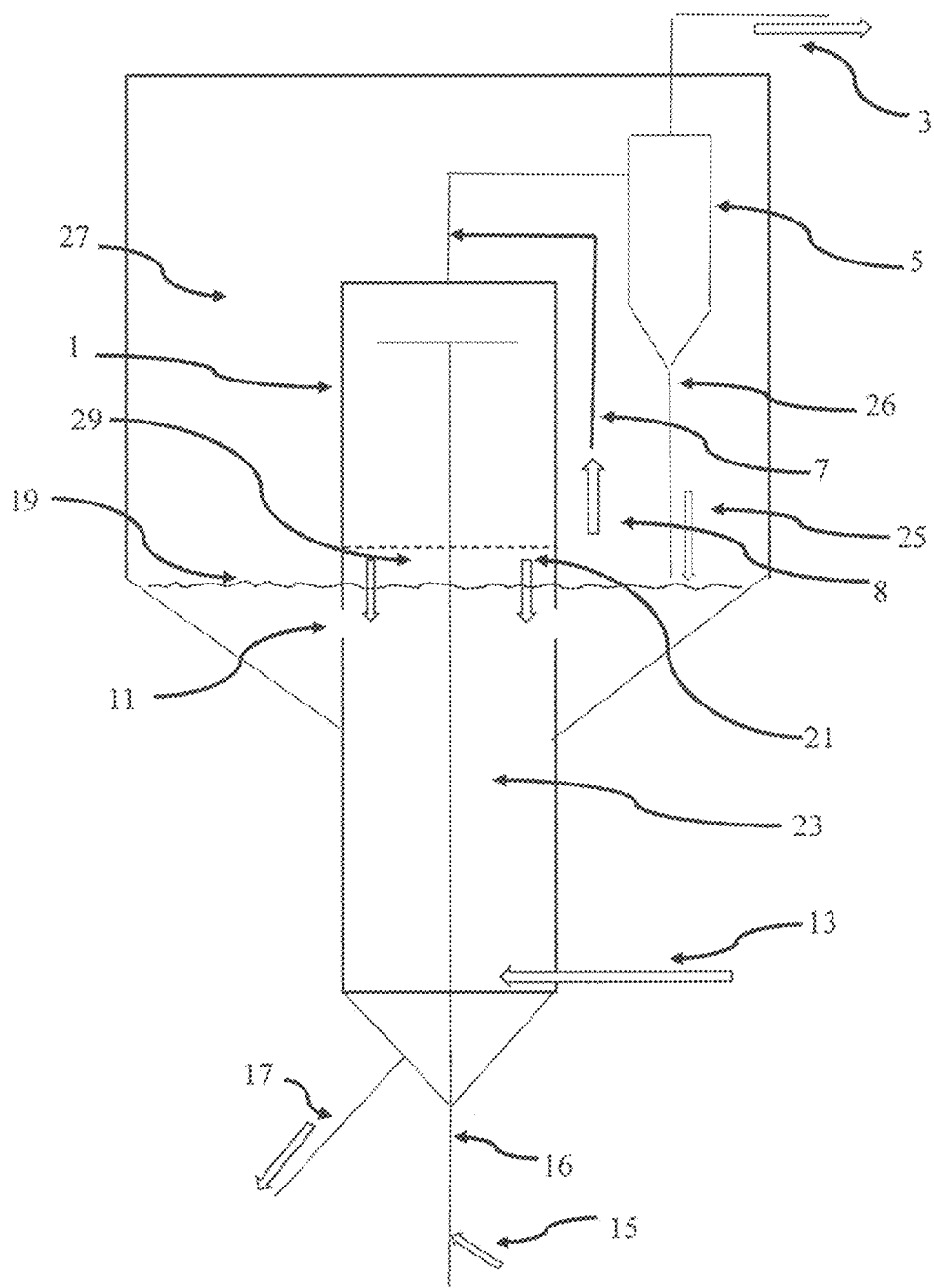
FIG. 1 is a schematic representation of a conventional high containment VSS, stripper and primary cyclone system.

FIG. 1 is a schematic representation of a typical high containment VSS and reactor stripper configuration. Feed injection nozzles 15 inject feed into a flowing stream of catalyst. The resulting suspension reacts rapidly and flows through a plug flow riser reactor 16 into the VSS separation chamber 1 where most of the catalyst is separated. The catalyst then flows down into the stripper section 23 along with some hydrocarbon underflow 21 that is still contained within the catalyst voids. The majority of the hydrocarbon vapor products and any entrained catalyst then pass through several single stage cyclones 5 housed within the reactor vessel 27 for final catalyst separation prior to entering the combined vapor product line 3. This entrained catalyst then flows from the cyclones through diplegs 26 into the catalyst bed 19 located in the outer annulus section of the reactor vessel 27. The vapor flow 8 in the reactor vessel 27 contains some but not all of the entrained hydrocarbons 25 flowing with this dipleg catalyst is ultimately vented from the reactor vessel via several vent pipes 7 back into the vapor transport line. The dipleg catalyst and any residual hydrocarbon underflow then passes into the stripper section via a series of openings 11 within the VSS. All the catalyst along with any adsorbed or entrained hydrocarbons enter the upper dense bed stripping section 23. Stripping steam 13 is injected into the lower section of the stripper and rises counter-current to the downward flowing catalyst for displacement of these adsorbed and entrained hydrocarbons from the catalyst prior to it entering the regenerator via standpipe 17. The stripping section 23 contains baffles or packing in order to facilitate effective hydrocarbon removal. Excess steam and any displaced hydrocarbons leave the upper section of the stripper through the dense bed freeboard section 29 prior to reentering the VSS 1. The main objectives in any high containment system is operability, flexibility, with minimum underflow of reactor products and efficient stripping of whatever underflow persists. In FIG. 1, this would involve minimizing the hydrocarbon flow in streams 21 and 25 along with a low voidage, high percent steam, net catalyst flow to the regenerator through standpipe 17. The following shows the significant impact high "J" values, the stripper freeboard and the "soft coke" dry gas reactions are having on a typical commercial VSS, reactor stripper configuration. Unlike the Direct Coupled System, the VSS stripper is connected directly to the VSS chamber via the beds freeboard 29 which essentially contains a well mixed 100% reactor effluent environment. In the DCC system the content in the reactor vessel is essentially inert steam, cyclone dipleg underflow and cracked dry gas.

Figure 2:
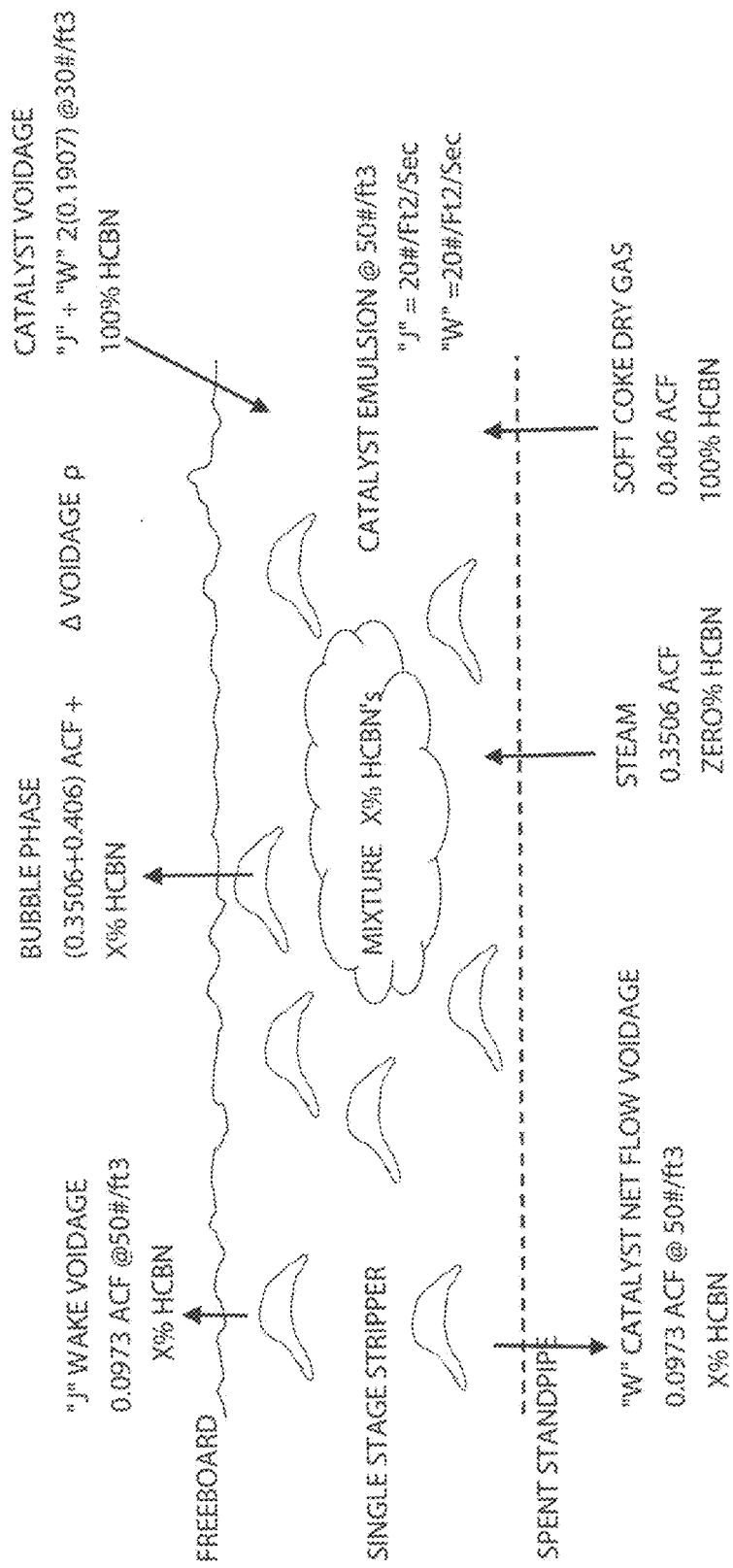
FIG. 2 illustrates a steam/hydrocarbon voidage balance across the VSS freeboard and a single stage reactor strippers.

FIG. 2 illustrates a steam/hydrocarbon voidage balance across the VSS freeboard 29 and a single stage reactor stripper configuration. With the typical FCC processing conditions listed in Table 6 and the corresponding hydrocarbon, steam entrainment rates shown in Table 7 it clearly demonstrates the significant impact the prevailing "J" values, freeboard activity and the "soft cokes" cracked gas production has on the hydrocarbon underflows 21 and overall stripping efficiencies.

TABLE 6

| TYPICAL FCC PROCESSING CONDITIONS | |
|---|---|
| BASE CONDITIONS | |
| lbSTM/1000 lb CAT | 2.0 |
| STRIPPING STEAM | 1.4 wt % ff |
| CAT/OIL | 7.0 |
| REACTOR TEMPERATURE | 1000 F. |
| REACTOR PRESSURE | 20PSIG |
| STRIPPER CATALYST FLUX | 20 lb/ft2/sec |
| "J" VALUE | 20 lb/ft2/sec |
| STRIPPER CSA | 0.35 ft2/lbff |
| Catalyst Flowing Density | 30 lb/Ft3 |
| Catalyst Emulsion Density | 50 lb/Ft3 |
| "SOFT COKE" Dry Gas Production | 0.81 wt % ff |
| Dry Gas Molecular Weight | 9 |

TABLE 7

HYDROCARBON AND STEAM ENTRAINMENTS

| STRIPPER/DIPLEG DENSITY | HCBN'S ACF/lbFF | HCBN'S Wt % FF | STEAM ACF/lbFF | STM/HCBN Vol % |
|---|---|---|---|---|
| 50 | 0.0973 | 2.16 | 0.3506 | 3.61 |
| 40 | 0.1326 | 2.93 | 0.3506 | 2.64 |
| 30 | 0.1907 | 4.23 | 0.3506 | 1.84 |
| 20 | 0.3073 | 6.81 | 0.3506 | 1.14 |

FIG. 2 Volume Flows:

Steam to stripper = 0.3506 $ACF/lbFF$

Catalyst Voids = 0.0973 $ACF/lbFF$ @50lb/Ft3 and 7 Cat/oil

= 0.1907 $ACF/lbFF$ @30lb/Ft3 and 7 Cat/oil

Using $\varepsilon = (1 - \rho_B / 164)$

Voidage Balance (ACF/lb Ff):

$0.3506 + 2(0.1907) + 0.406 = 2(0.0973) + 0.3506 + 0.406 + 2(0.0973)$

Voidage Percent Hydrocarbon Balance:

$2(0.1907)100 + (0.406)100 = 2(0.0973)X + 0.3506X + 0.406X + 2(0.0973)X$ $X = 69.17$ Vol% HCBN's

Without the "J" flow and dry gas reactions a single theoretical backmixed stage, with a catalyst inlet density of 30 lb/ft³ and a 1.84 steam/hydrocarbon volume ratio, would have a much higher stripping efficiency and produce a significantly lower hydrocarbon mix.

$X = 35.20$ Vol% HCBN's

The "J" bubble wake and freeboard entrainment not only effects the stripper efficiency; but, more importantly, the Wt% of riser products or underflow that's going into the stripper, where it will rapidly undergo the undesirable secondary reactions that were illustrated in Table 1. Table 7, shows that with a 30 lb/ft³ flowing density into the stripper and a 20 lb/ft²/sec "J", the VSS underflow, stream 21 in FIG. 1, increases from 2.93 to 8.46 wt% ff.

Also, the dry gas production that is being generated from the "soft coke" and additional conversion reactions, now combines with the steam to produce a much higher superficial velocity of 2.16 Ft/sec in the upper section of the commercial stripper.

STEAM VELOCITY 1.0 Ft/sec
LIGHT GAS VELOCITY 1.16 Ft/sec
COMBINED VELOCITY 2.16 Ft/sec In an actual commercial stripper, operating at these much higher combined superficial velocities in the upper stripper section, the bubbling bed model no longer applies. The upper bed has become very turbulent with an extensive freeboard region and high catalyst entrainment into the lower section of the VSS. If the system was to be designed and operated at even higher catalyst fluxes, like 30 lb/ft²/sec, and some are, the combined superficial velocity would be 3.24 ft/sec. As shown in FIG. 1 there is still a need to account for the primary cyclone dipleg underflow 25.

Figure 3:
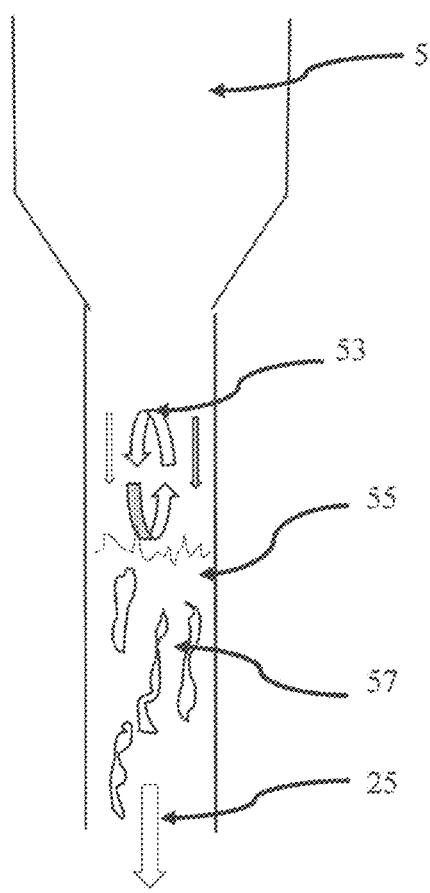
FIG. 3 shows the catalyst and voidage flow in a typical primary cyclone dipleg for either a DCC or VSS high containment system.

FIG. 3, shows a schematic representation of a typical primary cyclone and dipleg 26. The catalyst flow in the upper section 53 is streaming flow. In commercial operations dipleg catalyst fluxes run between 50-80b/ft²/sec. In the sealed lower section 55, these fluxes unfortunately generate emulsion phase velocities that are greater than the maximum bubble riser velocity. Since $U_L$ or $U_e > U_b$, the gas and catalyst flow 57 become co-current. This produces a flowing medium with a high voidage, low density that results in further highly undesirable hydrocarbon underflow 25.

Unfortunately, in the VSS reactor stripper system the "J" catalyst voids will always leave the stripper 23 via the freeboard 29 partially stripped but return 100% loaded with riser products as unwanted underflows 21 or 25.

With the prevailing upper stripper velocities, "J" values and freeboard activity the VSS catalyst separation efficiency will probably drop significantly from 95% to say 90%. At 90% separation efficiency and a 20 lb/ft³ dipleg density, this would generate a 0.681 wt% ff hydrocarbon underflow in stream 25, bringing the total underflow in streams 21 and 25 to 9.141 wt% ff.

Unlike the DCC, the VSS reactor vessel is essentially 100% full of relatively stagnant, high molecular weight, hydrocarbons with little or no steam. A perfect environment for coke formation.

The present day high containment VSS stripper configuration shown in FIG. 1 has been determined to have significant design issues. The following simple, yet highly effective, design modifications disclosed herein should produce significantly high riser product containment and thereby generate further desired selectivity improvements, higher stripping efficiencies, and greater operating flexibility with the elimination of any future potential coke formation within the reactor vessel.

The design modifications can vary but most can be easily incorporated into existing VSS units and eliminate all of the issues discussed throughout this review. The three zone stripper modifications actually utilize the significant "soft coke" dry gas production to the reactor stripper's advantage.

Figure 4:
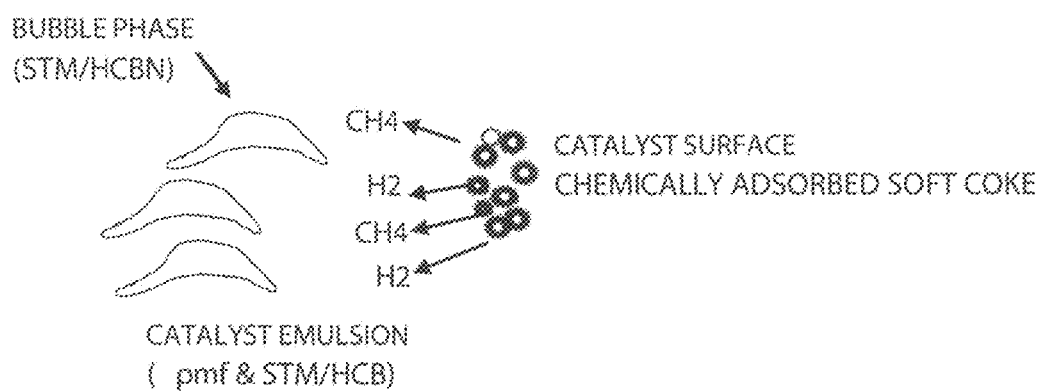
FIG. 4 is a schematic representation of the "soft coke" reactions from the catalyst's interstitial voids and surface into the reactor stripper's emulsion and bubble phase.

FIG. 4 shows a schematic representation of the "soft coke" reactions from the catalyst's interstitial voids and surface into the strippers emulsion and bubble phase. These products, are continuously being produced from the flowing catalyst. Since they are primarily hydrogen and methane, they have extremely low molecular weights and are essentially inert. With the migration of these products from the catalysts inner pores and surface area, through the emulsion phase to the bubble phase, they offer an excellent initial stripping medium for the higher molecular weight, riser product, underflow material. The continuous but declining production of these inert hydrocarbons from this source makes the overall catalyst residence time distributions in the VSS stripper critical in achieving high overall stripping efficiencies.

Figure 5:
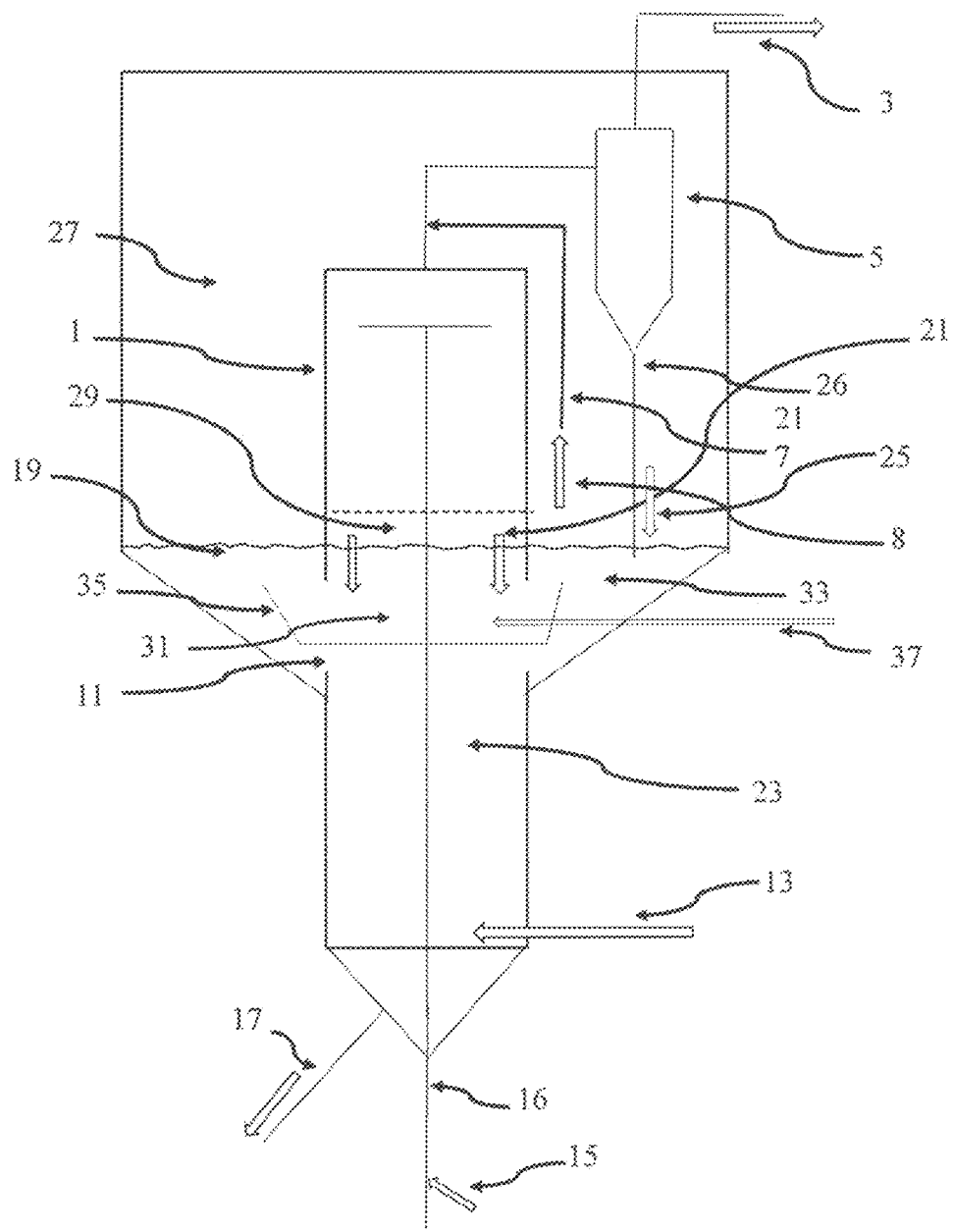
FIG. 5 shows a modified higher containment VSS with 3 zone reactor stripping.

FIG. 5 shows the invention of a commercial design for a 3 zone VSS stripper configuration. The design essentially eliminates most of the negative issues discussed throughout this review. This invention includes a baffle addition 35 that segregates the stripper into three zones 31, 33 and 23. The first zone 31 is a "cracked gas" stripping zone with a low 0.2 to 0.5 Ft/sec superficial gas velocity. The only gas entering this zone is the underflow 21 along with the "cracked gas" being produced. The freeboard activity 29 and the "J" values are therefore low. The average catalyst residence time, 10 to 20 sec's at 1000° F. reactor temperature, is sufficient to complete over 50% of the "soft coke" reactions. A small amount of additional steam 37 is available to maintain minimum bubbling velocity if required. The partially stripped catalyst then flows into the, higher residence time, transition zone 33 in the reactor vessel 27. Where any residual "soft coke" reactions are completed and stripped along with most of the remaining riser product underflow using the gas from the main stripper 23. The catalyst then enters the existing main stripper 23 for final "cracked gas" displacement. This system could also include stripper packing at the entrance of zone 1 to further suppress freeboard activity and "J" values. Such design modifications will reduce the net product underflow from 8.46 wt% ff to 2.50 wt% ff and thereby achieve significant additional improvements in desired product yields, selectivity and overall stripper efficiency.

Figure 6:
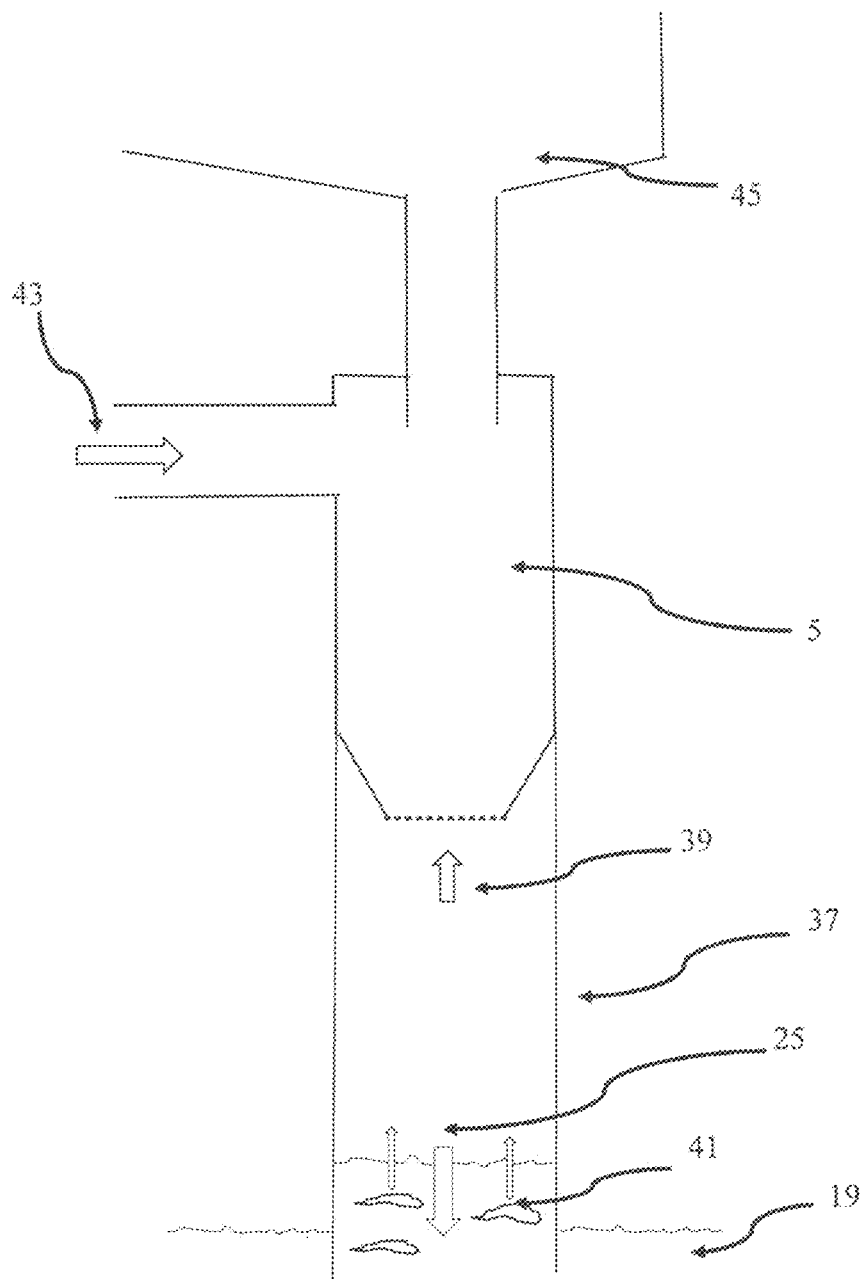
FIGS. 6 and 6A show a primary reactor cyclone with a modified barrel dipleg for either a high containment DCC Rough Cut Cyclone or VSS application.
Figure 6A:
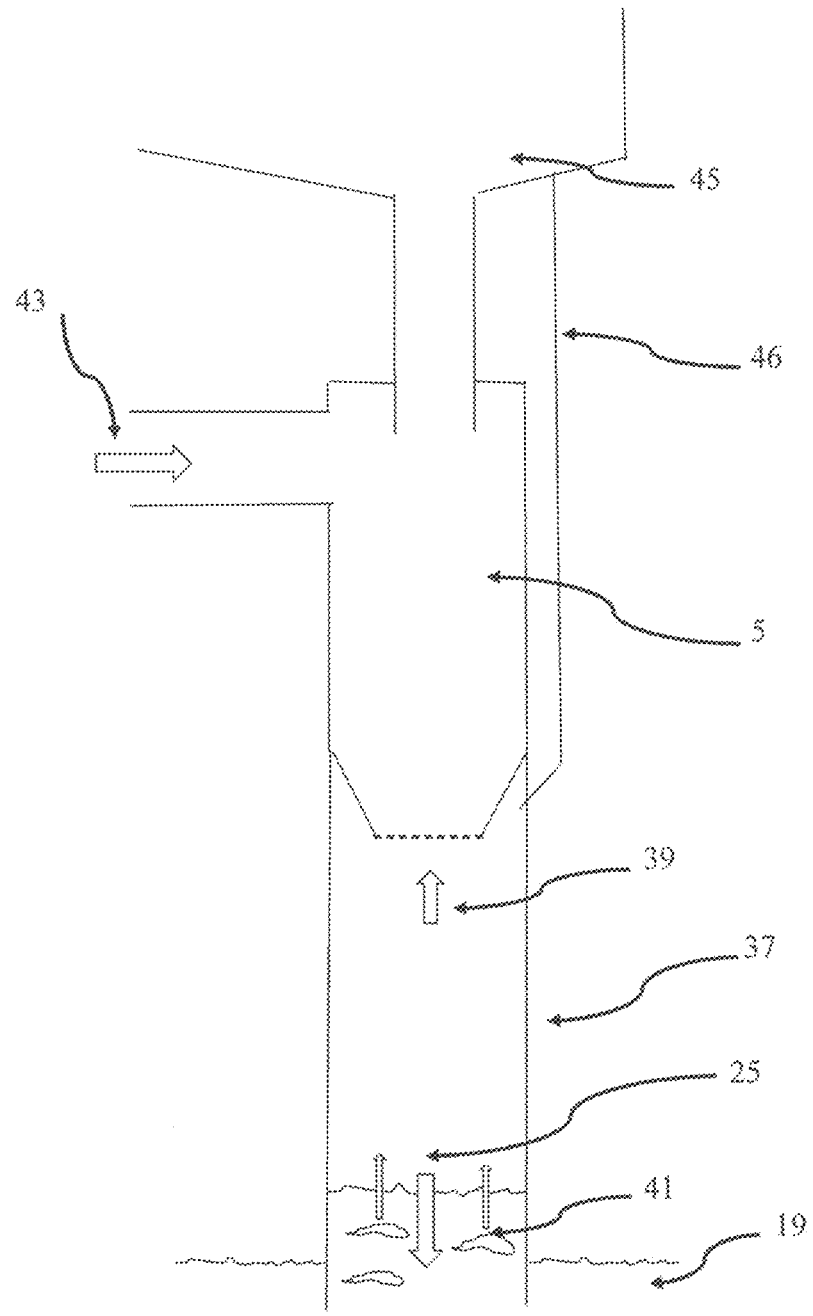

FIGS. 6 and 6A shows the invention of a primary reactor cyclone 5 with a modified barrel dipleg 37 for either a high containment DCC. Rough-cut Cyclone or VSS application. The invention has an outer sleeve addition 37 that extends the cyclone barrel down to the stripper bed 19 and shortens the previous dipleg to just beyond the vortex. Any excess gas 39 can now be vented back into the cyclone 5 or as in FIG. 6A into the reactor plenum 45 via additional vent pipes 46. In the DCC or Rough Cut Cyclone systems the vent gas could be discharged to any location downstream of the primary cyclone separator. The vortex and high cyclone separation efficiency is still maintained. The catalyst flux, in the modified barrel dipleg 37, will be reduced to less than 20 lb/ft²/sec; thereby producing a countercurrent bubble/emulsion phase flow 41, since $U_e$ is now less than $U_b$. The flowing catalyst density in the modified dipleg will approach minimum fluidization density, which will be close to 50 lb/ft³. This reduces the underflow 25 to 0.108 wt% ff. The "soft coke" cracked gas production will always maintain minimum fluidization and achieve some displacement of riser products.

Figure 7:
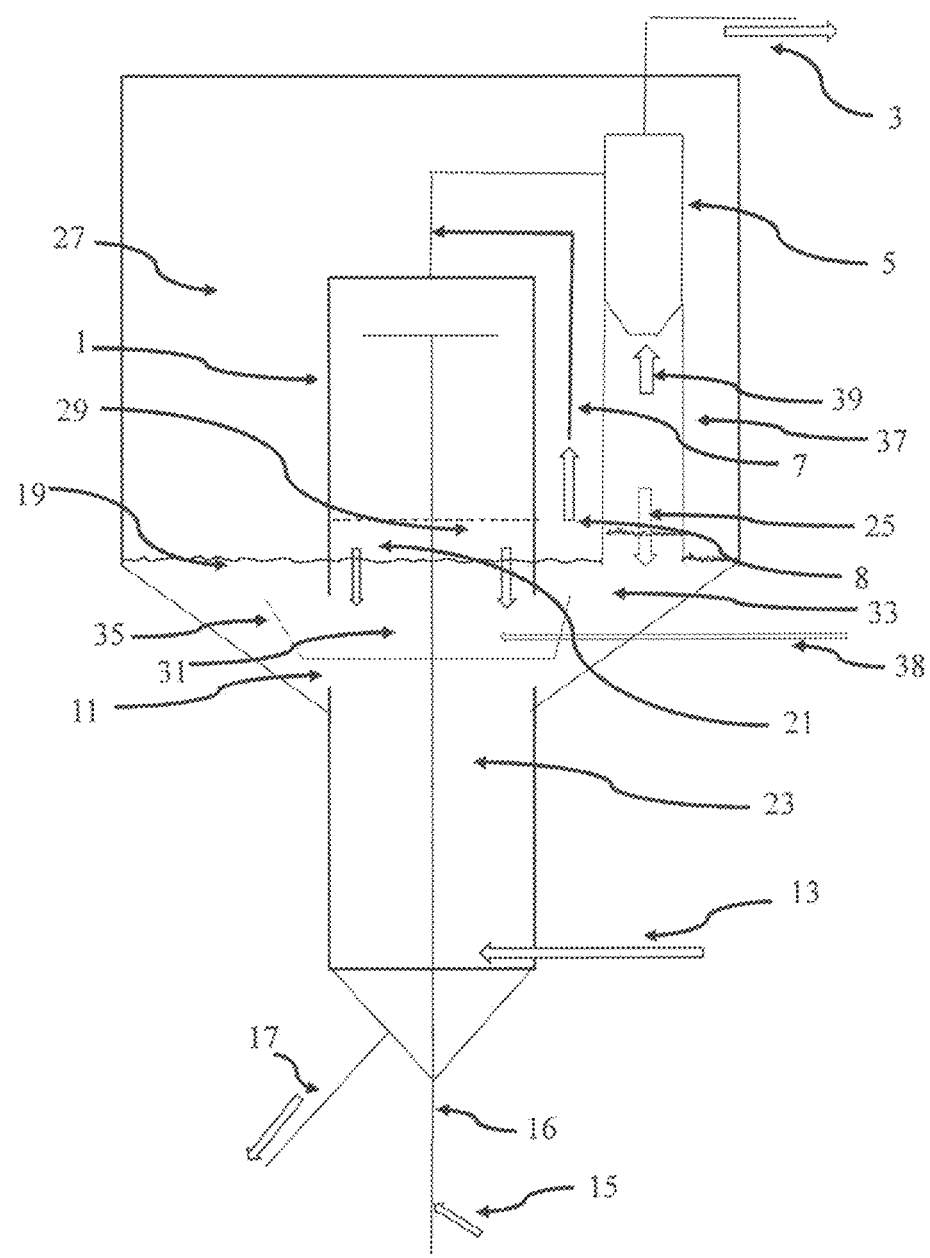
FIG. 7 shows a modified higher containment VSS with a 3-zone reactor stripper along with the modified primary cyclone barrel dipleg.

FIG. 7 shows the combined invention of a 3-zone stripper and barrel cyclone dipleg. The total combined underflow with these two inventions as now been reduced from 9.141 wt% ff to 2.27 wt% ff. This type of cyclone dipleg modification can also be used in either a Rough-Cut or +/−pressure DCC application. The potential coke formation in the reactor vessel has now been eliminated. Assuming only 50% conversion of the "soft coke" in zone 1, Table 8 shows the new volume percent vapor composition in the reactor vessel. It's dropped from almost 100 vol % reactive hydrocarbons, with low flow in FIG. 1, to 6.3 vol % reactive hydrocarbons, with high flow, in the new FIG. 7 design.

TABLE 8

VAPOR COMPOSITION IN RX VESSEL

| | Mol Wt | Wt % FF | Vol % Rx Eff | Vol % In Rx Vessel |
| --- | --- | --- | --- | --- |
| STRIPPING STEAM | 18 | 1.40 | 7.77 | 59.64 |
| CRACKED DRY GAS | 9 | 0.41 | 4.44 | 34.08 |
| HCBN UNDERFLOW | 100 | 0.81 | 0.81 | 6.28 |

Figure 8:
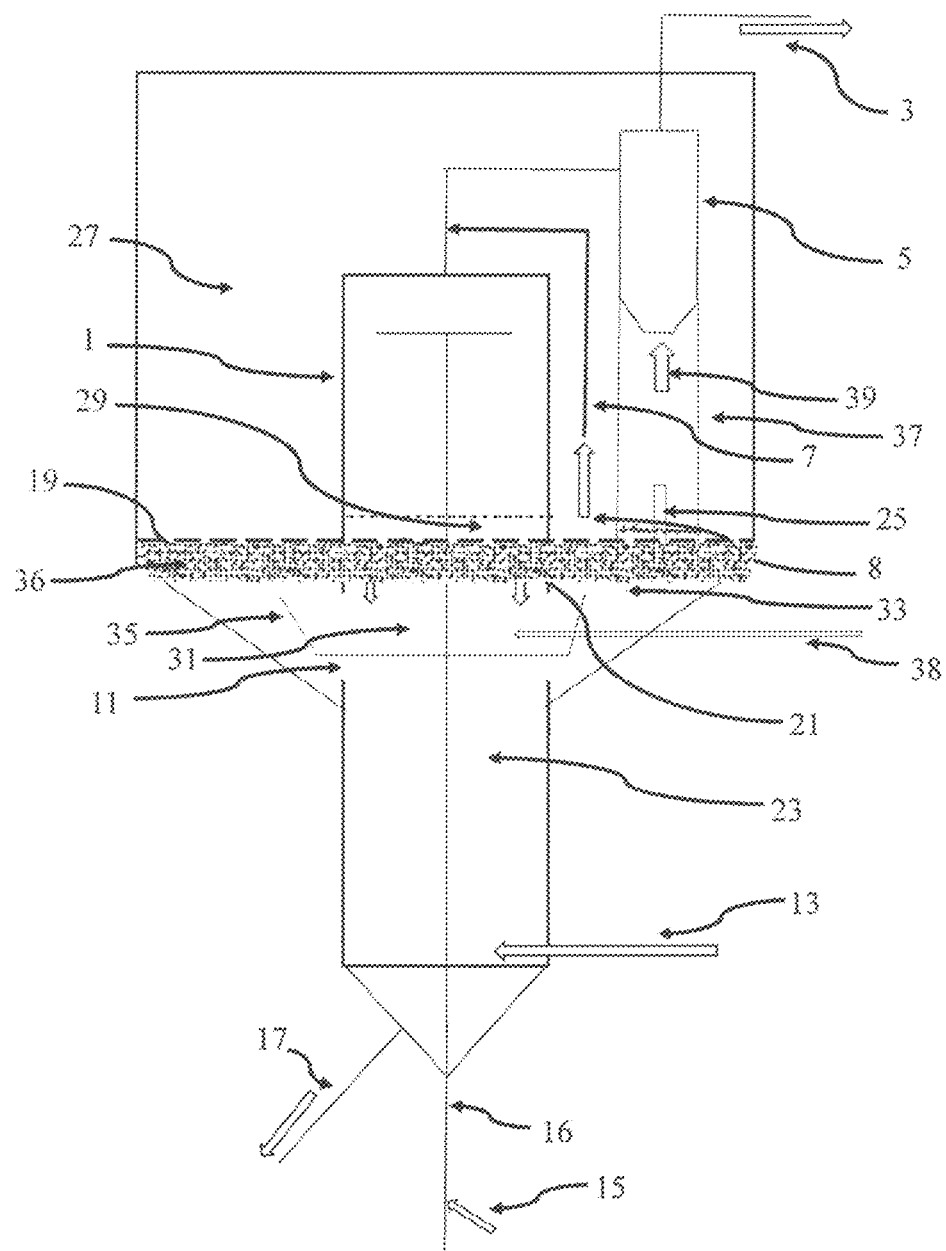
FIG. 8 shows a modified higher containment VSS with a 3-zone reactor stripper along with the modified primary cyclone barrel dipleg and packing in the freeboard.

With such a vapor composition and flow, vapor stream 8 now as the potential for a separate cyclone/condensation and recovery system:
STEAM 59.6 Vol %
$H_2/CH_4$ 34.1 Vol %
UNDERFLOW 6.3 Vol %
TOTAL FLOW 13.028 Vol% Rx effluent FIG. 8 shows the combined invention of a 3-zone stripper and barrel cyclone dipleg along with the addition of stripper packing 36 at the entrance of the stripping zone one 31 to further suppress freeboard activity and "J" values.

Figure 9:
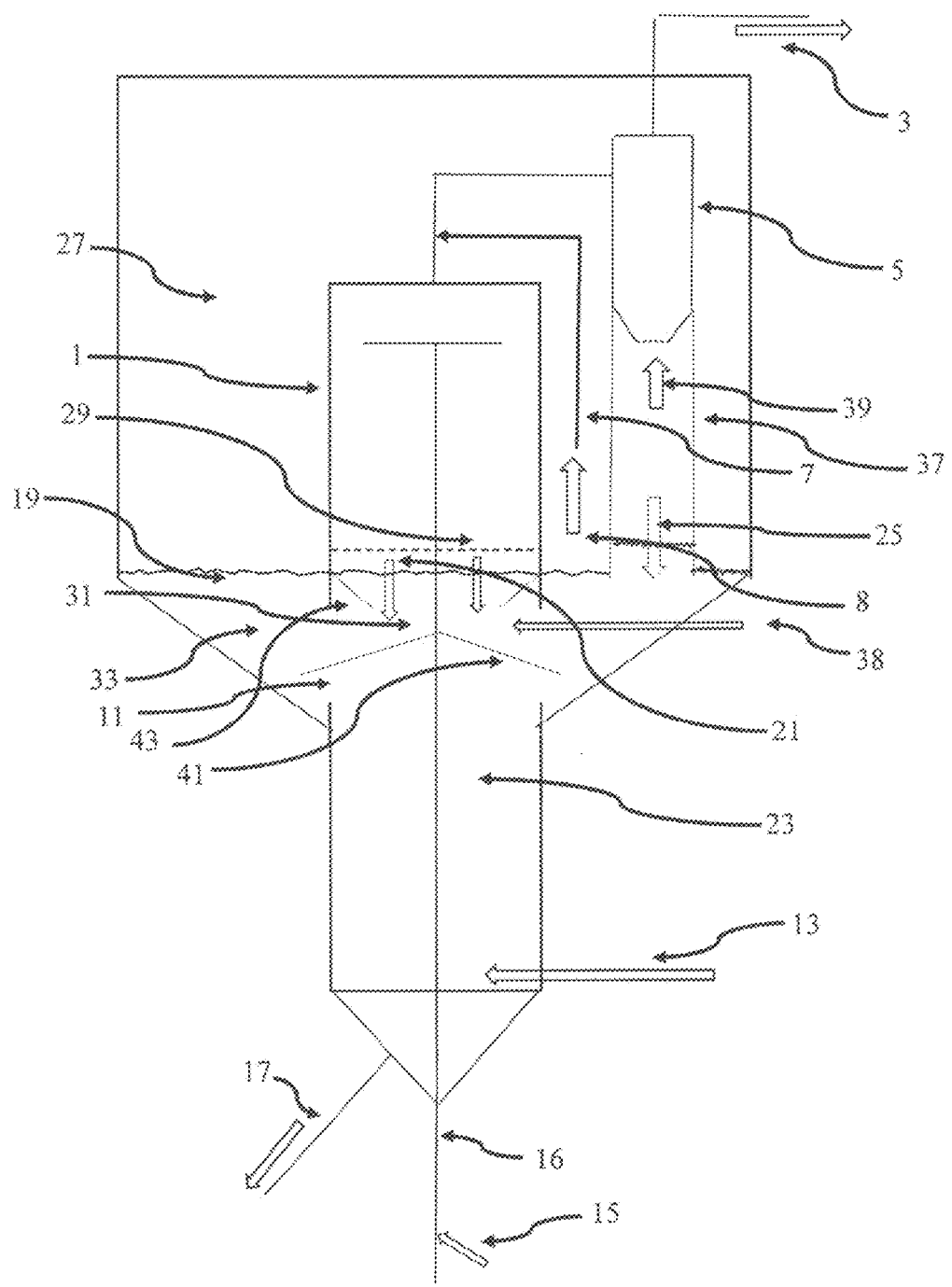
FIG. 9 shows a modified higher containment VSS with a crossflow 3 zone reactor stripper along with the modified primary cyclone barrel dipleg.

FIG. 9 shows a combined 3 zone crossflow stripper and barrel cyclone dipleg invention. The two baffles 41 and 42 are arranged to initiate catalyst crossflow in zone one 31 for better residence time distribution and more "soft coke" reactions per linear foot of stripper.

Figure 10:
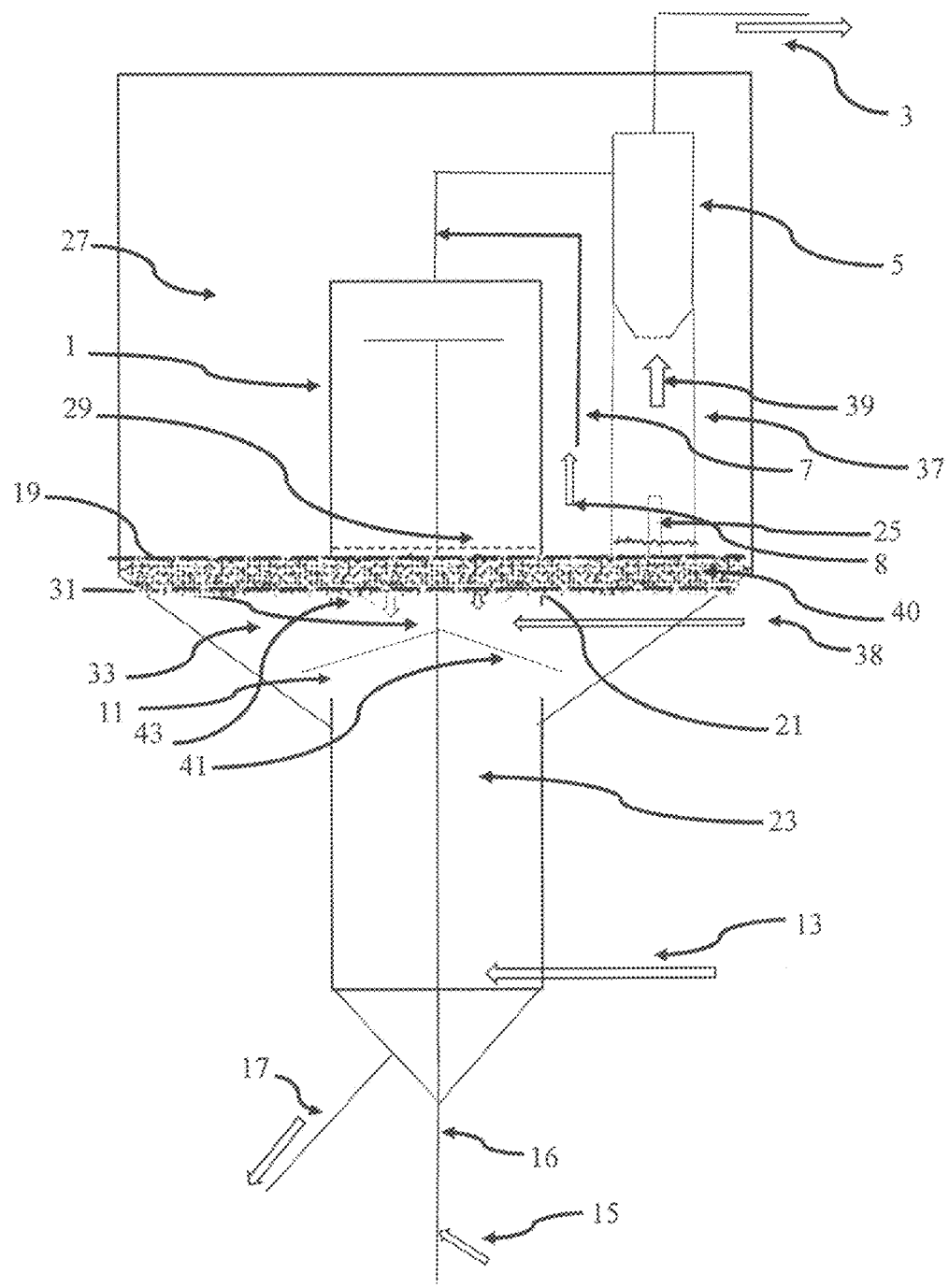
FIG. 10 shows a modified higher containment VSS with a crossflow 3 zone reactor stripper along with the modified primary cyclone barrel dipleg and packing in the freeboard.
Figure 11:
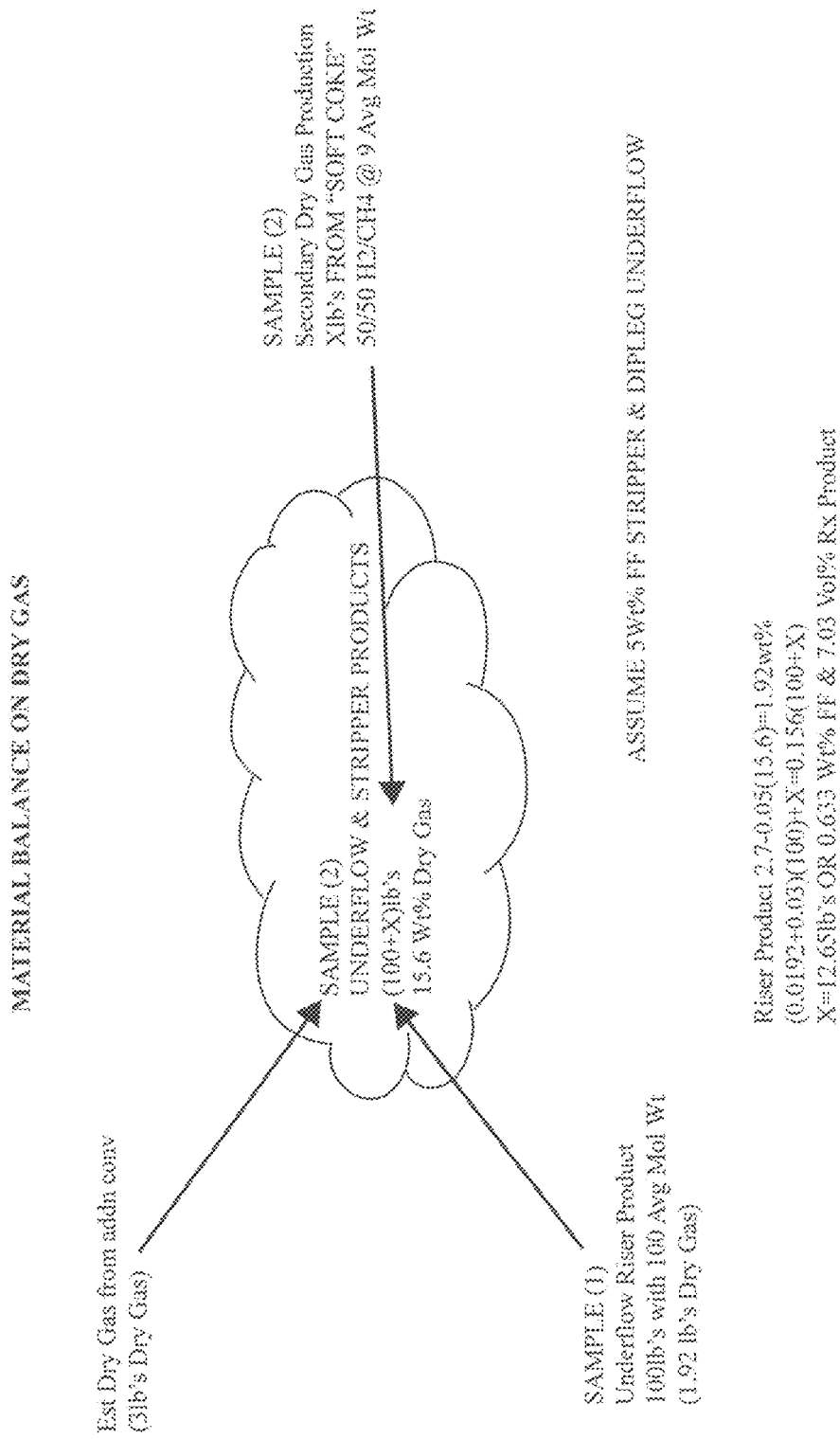
FIG. 11 illustrates a material balance on dry gas in a typical primary cyclone dipleg for either a DCC or VSS high containment system.

FIG. 10 shows a combined 3 zone crossflow stripper and barrel cyclone dipleg invention along with the addition of stripper packing 40 at the entrance of the stripping zone one 31 to further suppress freeboard activity and "J" values.

Other embodiments of this invention are:

If a high ZSM-5, petrochemical operation is desired, one should still use these design innovations but increase the steam flow 38 to zone one 31. Thereby, in a controlled fashion, increasing the "J" valve and lowering the LHSV in the VSS chamber and increasing the catalyst entrained to the primary cyclone system 5. This would effectively increase the catalytic severity and light olefin yields for a given reactor temperature. The "cracked gas" from the reactor vessel could still be recovered separately and sent to a combustion chamber in the regenerator to augment the enthalpy coke.

The catalyst residence times in stripping zones 31 and 33 can be controlled via the reactor level 19 and the spent slide valve opening. The residence time in zone one 31 is now particularly significant in that it will set the degree of dry gas production from the "soft coke" which will also vary with, and be dependent on, reactor temperature. This improved RTD in the three zone stripper also leads to lower regenerator $SO_x$ levels via the increased conversion of "soft coke" sulfur to hydrogen sulfide followed by its higher removal efficiency from within the catalyst voidage going to the regenerator.

In summary, it will be understood by those skilled in the art that the present invention shows how the addition of stripper baffles 35 or 41 and 43 and a modified, low catalyst flux, primary cyclone dipleg 37 can significantly reduce the underflow of reactor riser products 21, and 25 into an existing VSS stripper and reactor vessel. The addition of these baffles establishes three distinct stripping zones 31, 33 and 23 with no backmixing of catalyst between the zones. Zone 31 is a low velocity bubbling bed that uses the "soft cokes" light cracked products to displace and strip the VSS underflow 21. The "soft coke" reactions are completed in zone 33 prior to a conventional stripping in zone 23. This increased containment and multi zone stripping will produce higher desired product selectivities, improved stripping efficiency, lower regenerator $SO_x$ levels and a stripper vent gas 8, that continuously flows through the reactor vessel 27, that now has a significantly lower coke forming potential due to its low concentration of ethylene and higher molecular weight material, shown in table 8, that could, if desired, be recovered separately from the primary riser products. These stripper baffles could be used with or without the packing 40 at the freeboard zone 29 or the modified diplegs 37. The modified, low catalyst flux, primary cyclone dipleg 37 can be used independently on either a DCC or Rough Cut cyclone system to significantly reduce their underflow of reactor riser products 25, shown in Table 1, into the reactor vessel. The catalyst bed level in zone 31 can be further controlled to achieve the desired residence time and more conversion of the "soft coke" material to hydrogen and methane. A high ZSM-5, petrochemical type operation can now be established by controlling the 'J' values, LHSV in the VSS chamber and increasing the catalyst to oil ratio in the vapor line to the primary cyclone. With a separate recovery and treatment, another option for the hydrogen and methane "cracked gas" 8 from the reactor vessel 27 could be in a combustion chamber in the regenerator to augment the enthalpy coke.

I claim:

1. An improved vortex separation system comprising:
a VSS separation chamber;
a stripper zone;
at least one vent pipe wherein stripper vapers exit the system;
a baffle located between the stripper zone and the VSS separation chamber,
wherein the baffle is an inverted V-shape having distal ends extended beyond the VSS separation chamber to increase stripper vapor diversion around the VSS separation chamber.

2. An improved vortex separation system that generates significantly higher plug flow containment of primary riser products due to reduced back mixing within the chamber and a lower final vapor product underflow within a catalyst void that comprises of:
a VSS separation chamber;
a baffle located between an original stripping zone 23 and the VSS separation chamber, creating a three-zone stripping section having stripping zones 31, 33, and 23;
wherein the baffle is configured to direct stripper vapors 8, exiting zones 23 and 33, away from the VSS separation chamber; and
wherein the stripper vapors from zones 23 and 33 rise through zones 23 and 33, bypassing the VSS chamber and exit the reactor vessel via an at least on vent pipe 7 into a VSS riser.

3. The improved vortex separation system of claim 2 wherein steam is injected in the cracked gas stripping zone 31 to maintain a bubble fluidized bed of 0.2 to 0.5 feet per second superficial gas velocity.

4. The improved vortex separation system of claim 2 wherein an open grid structure, or packing, is located in a fluidized bed free board region 29 to reduce catalyst re-entrainment into the VSS chamber.

5. The improved vortex separation system of claim 2 wherein an open grid structure, or packing, is located in a fluidized bed free board region 33 to reduce catalyst re-entrainment into the VSS chamber.

6. The improved vortex separation system of claim 2 wherein an open grid structure, or packing, is located in a fluidized bed free board regions 29 and 33 to reduce catalyst re-entrainment into the VSS chamber.

7. The improved vortex separation system of claim 2 wherein the baffle is designed to generate additional cross flow catalyst as it flows through zone 31 also improving the residence time distribution and allowing more efficient time for the various highly desirable soft coke cracking reactions to proceed.

8. The improved vortex separation system of claim 2 wherein baffle 41 and its openings for captured of vapor flow extend beyond the circumference of the VSS chamber to direct vapor products from stripping zone 23 into zone 33 and out a vent pipe 7.

9. An improved vortex separation system comprising:
a VSS separation chamber;
a stripper zone; and
a cyclone separator having a dipleg wherein the circumference of the dipleg is expanded such that the flowing catalyst flux lb/ft$^2$/sec in the dipleg is reduced to produce a flowing velocity less than the bubble rise velocity.

10. An improved vortex separation system comprising:
a VSS separation chamber;
a stripper zone;
at least one vent pipe wherein stripper vapers exit the system
a baffle configured to divert vapor from the stripper chamber away from the VSS separation chamber; and
a cyclone separator having a dipleg where in the circumference of the dipleg is, configured such that the flowing catalyst flux lb/ft$^2$/sec in the dipleg is reduced to produce a flowing velocity less than the bubble rise velocity.

11. An improved vortex separation system comprising:
a reactor vessel having a bottom section;
a VSS chamber within the reactor vessel;
a stripping chamber with the bottom section of the reactor vessel
a baffle 35 that segregates the stripping chamber into three separate stripping zones, a cracked gas stripping zone 31, a transition zone 33, and a main stripper 23.

12. The improved vortex separation system of claim 11 wherein the cracked gas stripping zone 31 has a 0.2-0.5 Ft/sec superficial gas velocity.

13. The improved vortex separation system of claim 12 wherein the transition zone 33 has an increased residence time.

14. The improved vortex separation system of claim 13 wherein the net product underflow is reduced from 8.46 wt % Fresh Feed to 2.50 wt % Fresh Feed.

15. The improved vortex separation system of claim 11 wherein stripper packing 36 is added at stripping zone 31 to further suppress freeboard activity and J values.

16. A cyclone separator comprising:
a cyclone separator; and
a dipleg wherein the circumference of the dipleg is expanded such that the flowing catalyst flux lb/ft$^2$/sec in the dipleg is reduced to produce a flowing velocity less than the bubble rise velocity.

17. The cyclone separator of claim 16 wherein the cyclone separator is used in a high containment Direct Coupled Cyclone, Rough-Cut Cyclone, RS2, or VSS application.

18. The cyclone separator of claim 16 wherein the catalyst flux is reduced to less than 20 pounds/ft2/sec.

19. An improved crossflow vortex separation system comprising:
a chamber 27;
a baffle 41 that segregates a stripper into three zones 31, 33 and 23;
a VSS separation chamber 1 having at least one outer wall; and
at least one deflection shield 43 engaged with at least one outer wall and angularly disposed with the at least one outer wall, the defection shield acting to deflect catalyst falling through the VSS separation chamber 1 toward the center of the VSS separation chamber.

20. The improved crossflow vortex separation system of claim 19 wherein the baffle 41 is angularly disposed in an opposing direction to engage with and deflect the falling catalyst toward the walls of the chamber 27.

21. The improved crossflow vortex separation system of claim 20 wherein catalyst continues to fall into a main stripping zone 23 where it is further stripped by steam from a pipe 13 rising through chamber 23 and engaging with the baffle 41 and being directed away from the VSS chamber 1.

22. An improved vortex separation system comprising:
a chamber 27;
a baffle that segregates the stripping chamber into three separate stripping zones, a cracked gas stripping zone 31, a transition zone 33, and a main stripper 23;

a VSS separation chamber 1 having at least one outer wall; and wherein as catalyst falls from the VSS chamber 1, the baffle directs the falling catalyst into the cracked gas stripping zone 31, which is then directed into the transition zone 33, before entering the main stripper 23.

23. The improved vortex separation system of 22 wherein the three stripping zones increase the residence time of the falling catalyst in the cracked gas stripping zone 31 and the transition zone 33.

24. The improved vortex separation system of claim 23 having at least one deflection shield 43 engaged with at least one outer wall and angularly disposed with the at least one outer wall, the defection shield acting to deflect catalyst falling through the VSS separation toward the center of the VSS separation chamber 1.

25. The improved vortex separation system of claim 24 having a cyclone separator wherein the dipleg is expanded, such that the flowing catalyst flux lb/ft$^2$/sec in the dipleg is reduced to produce a flowing velocity less than the bubble rise velocity.

26. The improved vortex separation system of claim 25 wherein the catalyst bed level is raised or lowered to control residence time in the cracked gas stripping and the transition zones.

27. The improved vortex separation system of claim 26 wherein the increased resonance time reduces soft coke cracking reactions.

28. The improved vortex separation system of claim 26 wherein the net product underflow is reduced from 9.14 Wt. % on a fresh feed to 2.27 wt. % on a fresh feed.

29. The improved vortex separation system of claim 26 wherein the vent gas composition flowing through the reactor vessel contains less than 7 Vol % ethylene and C2 and heavier hydrocarbons.

30. An improved vortex separation system having multiple stripping zones comprising:

a reactor vessel;

a VSS separation chamber located within the reactor vessel;

a stripping chamber located beneath the VSS separation chamber in the bottom of the reactor vessel;

a baffle located between the stripping chamber and the VSS separation chamber creating multiple stripping zones 31, 33, and 23; and wherein the baffle is configured to direct stripper vapors exiting stripping zones 23 and 33 away from the VSS separation chamber.

31. The improved vortex separation system of claim 30 having at least one vent pipe wherein the stripper vapors exit the reactor vessel.

32. The improved vortex separation system of claim 31 wherein the catalyst bed level is adjusted to control residence time in stripping zones 31 and 33.

* * * * *